United States Patent
Wielhorski et al.

(10) Patent No.: US 12,159,396 B2
(45) Date of Patent: Dec. 3, 2024

(54) METHOD FOR AUTOMATICALLY RECONSTITUTING THE REINFORCING ARCHITECTURE OF A COMPOSITE MATERIAL

(71) Applicant: SAFRAN AIRCRAFT ENGINES, Paris (FR)

(72) Inventors: Yanneck Wielhorski, Moissy Cramayel (FR); Samy Blusseau, Paris (FR); Santiago Velasco-Forero, Gif-sur-Yvette (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 356 days.

(21) Appl. No.: 17/783,890

(22) PCT Filed: Dec. 9, 2020

(86) PCT No.: PCT/FR2020/052350
§ 371 (c)(1),
(2) Date: Jun. 9, 2022

(87) PCT Pub. No.: WO2021/116602
PCT Pub. Date: Jun. 17, 2021

(65) Prior Publication Data
US 2023/0009054 A1 Jan. 12, 2023

(30) Foreign Application Priority Data
Dec. 10, 2019 (FR) ..................... 1914066

(51) Int. Cl.
*G06T 7/00* (2017.01)
*G06T 7/62* (2017.01)
(Continued)

(52) U.S. Cl.
CPC .............. *G06T 7/001* (2013.01); *G06T 7/62* (2017.01); *G06T 7/66* (2017.01);
(Continued)

(58) Field of Classification Search
CPC ... G06T 7/001; G06T 7/11; G06T 7/12; G06T 7/174; G06T 7/62; G06T 7/66;
(Continued)

(56) References Cited

FOREIGN PATENT DOCUMENTS

| EP | 3 054 286 A1 | 8/2016 | |
|---|---|---|---|
| WO | WO-2015024580 A1 * | 2/2015 | ........... G01N 23/046 |
| WO | WO 2015/033044 A1 | 3/2015 | |

OTHER PUBLICATIONS

|International Search Report as issued in International Patent Application No. PCT/FR2020/052350, dated Mar. 17, 2021.
(Continued)

*Primary Examiner* — Mekonen T Bekele
(74) *Attorney, Agent, or Firm* — Pillsbury Winthrop Shaw Pittman LLP

(57) ABSTRACT

A method for automatically reconstituting the architecture, along a reinforcing axis, of the reinforcement of a composite material, includes acquiring images of the reinforcement of the composite material, each image being acquired along a section plane perpendicular to the reinforcing axis; for each image acquired, detecting, using a neural network, barycentre and/or the circumference of each section of the reinforcing thread; for at least one acquired reference image, assigning a tag corresponding to a reinforcing thread, to each detected barycentre or circumference; for each other acquired image, assigning, to each detected barycentre and/or each detected circumference, the tag of the corresponding barycentre in the acquired reference image; reconstituting the architecture of each reinforcing thread from each detected barycentre and/or circumference having the tag of (Continued)

the reinforcing thread and the position on the reinforcing axis associated with the acquired image on which the barycentre and/or the circumference has been detected.

10 Claims, 5 Drawing Sheets

(51) Int. Cl.
    *G06T 7/66*         (2017.01)
    *G01N 21/84*      (2006.01)
    *G01N 21/88*      (2006.01)

(52) U.S. Cl.
    CPC ............ *G01N 2021/8472* (2013.01); *G01N 2021/8883* (2013.01); *G06T 2200/04* (2013.01); *G06T 2207/10012* (2013.01); *G06T 2207/10061* (2013.01); *G06T 2207/10116* (2013.01); *G06T 2207/20081* (2013.01); *G06T 2207/20084* (2013.01); *G06T 2207/30124* (2013.01); *G06T 2207/30204* (2013.01)

(58) Field of Classification Search
    CPC ....... G06T 2200/04; G06T 2207/10012; G06T 2207/10061; G06T 2207/10081; G06T 2207/10116; G06T 2207/20081; G06T 2207/20084; G06T 2207/30108; G06T 2207/30124; G06T 2207/30204; G01N 2021/8472; G01N 2021/8883
    See application file for complete search history.

(56) References Cited

OTHER PUBLICATIONS

Stig, F., et al., "Spatial modelling of 3D-woven textiles," Composite Structures, vol. 94, No. 5, (2012), XP028909035, pp. 1495-1502.

Soriano, I., et al., "3D fibre architecture of fibre-reinforced sand," Granular Matter, vol. vol. 19, No. 4, Sep. 2017, XP036360771, pp. 1-14.

Shinohara, T., et al., "Extraction of Yarn Positional Information from a Three-dimensional CT Image of Textile Fabric using Yarn Tracing with a Filament Model for Structure Analysis," Textile Research Journal, vol. 80, No. 7, Sep. 2009, XP055359169, pp. 623-630.

* cited by examiner

METHOD FOR AUTOMATICALLY RECONSTITUTING THE REINFORCING ARCHITECTURE OF A COMPOSITE MATERIAL

CROSS-REFERENCE TO RELATED APPLICATIONS

This application is the U.S. National Stage of PCT/FR2020/052350, filed Dec. 9, 2020, which in turn claims priority to France patent application number 1914066 filed Dec. 10, 2019. The content of these applications are incorporated herein by reference in their entirety.

TECHNICAL FIELD OF THE INVENTION

The technical field of the invention is that of composite materials and more particularly that of methods for reconstituting the architecture of the reinforcement of a composite material.

The present invention relates to a method for reconstituting the architecture of the reinforcement of a composite material and in particular a method for automatically reconstituting the architecture of the reinforcement of a composite material. The present invention also relates to a computer program product and a recording medium making it possible to implement the method for reconstituting.

TECHNOLOGICAL BACKGROUND OF THE INVENTION

In the field of composite materials, reconstituting the architecture of the reinforcement of a composite material by identifying each reinforcing thread, also called strand, in the volume of the composite material, is an excellent way to have access to the actual internal geometry of the material. In particular, reconstituting the neutral fibre of each reinforcing thread, i.e. the line that connects the barycentres over the entire length of each reinforcing thread, makes it possible to obtain the weaving topology in order to be able for example to search for weaving anomalies, and reconstituting the envelope of each reinforcing thread makes it possible to obtain the morphology of the textile indispensable for the calculation of the local thermophysical and thermomechanical properties. Identifying each reinforcing thread also makes it possible to discriminate each reinforcing thread which can have different sizes, i.e. be comprised of a different number of fibres.

It is then possible to detect a defective part as soon as it is manufactured or to quantify the wear of a part made from composite material.

Currently, the reconstitution is carried out using tomographic images on which, either an operator has manually, or an image processing algorithm has automatically, identified the barycentre of the section of each strand/thread of the reinforcement.

In the two cases, the operation is extremely time consuming, a simple LEAP™ blade comprising several thousands of carbon threads, and therefore subject to many errors because it is sometimes impossible, even with the unaided eye, to distinguish the threads of the reinforcement from one another since their density is high.

There is therefore a need to obtain a method for reconstituting the architecture of the reinforcement of a composite material that is automatic and that has a reduced risk of errors.

SUMMARY OF THE INVENTION

The invention offers a solution to the problems mentioned hereinabove, by making it possible to automatically obtain a precise numerical model of the reinforcement of a composite material.

A first aspect of the invention relates to a method for automatically reconstituting the architecture, along a reinforcing axis, of the reinforcement of a composite material, the reinforcement comprising a plurality of reinforcing threads arranged along the reinforcing axis, the method comprising the following steps:

Acquiring a plurality of images of the reinforcement of the composite material, each image being acquired along a section plane parallel and not confounded with the section planes of the other images acquired, each image acquired being associated with a position on the reinforcing axis perpendicular to the section planes;

For each image acquired, detecting, using a first artificial neural network trained with a first training database, the barycentre of each section of reinforcing thread present in the acquired image and/or detecting, using a second artificial neural network trained with a second training database, the circumference of the section of each reinforcing thread present in the acquired image;

For at least one acquired image, referred to as acquired reference image, chosen from the acquired images, assigning a tag corresponding to a reinforcing thread, to each detected barycentre or to each detected circumference in the acquired reference image;

For each image acquired that was not chosen as an acquired reference image, assigning, to each detected barycentre and/or to each detected circumference in the acquired image, the tag of the corresponding barycentre or of the corresponding circumference in the acquired reference image;

Reconstituting the architecture of each reinforcing thread arranged along the reinforcing axis from each detected barycentre and/or from each detected circumference having the tag of the reinforcing thread and the position on the reinforcing axis associated with the acquired image on which the barycentre has been detected and/or the circumference has been detected.

Thanks to the invention, the first artificial neural network makes it possible to automatically detect the barycentre of each section of reinforcing thread present in the acquired images and/or the second artificial neural network makes it possible to automatically detect the circumference of each section of reinforcing thread present in the acquired images. Tagging makes it possible to link each detected barycentre and/or each detected circumference to a reinforcing thread in order to be able to automatically reconstitute its trajectory and/or its envelope.

By comparing the reconstituted trajectory of a reinforcing thread and the corresponding trajectory in the weaving pattern of a part, it is then possible to detect a weaving anomaly present in the reinforcement of the part as soon as it is manufactured. This operation therefore allows for the automated extraction of the topology of the textile and as such to compare it with the target topology.

The shape of the envelope of a reinforcing thread makes it possible to have local geometrical information that is indispensable for the evaluation of its mechanical properties. Indeed, knowing the number of fibres that constitute a thread and the volume of the latter, it is possible to determine the volume rate of fibres that it contains locally, directly influencing its thermomechanical properties. Thus, if several reconstructions are carried out of the same composite material subjected to different external stresses, it is then possible to know the surface deformation that the thread is subjected to according to the external conditions that are applied to it and thus supply laws with data making it possible to reveal its mechanical behaviour.

In addition to the characteristics that have just been mentioned in the preceding paragraph, the method according to a first aspect of the invention can have one or more additional characteristics among the following, taken individually or in any technically permissible combination.

According to an alternative embodiment, the first and/or the second artificial neural network are multi-layer perceptrons or convolutional artificial neural networks.

According to an alternative embodiment compatible with the preceding alternative embodiment, the first and the second training databases each comprise a plurality of images of at least one composite training material each acquired along a section plane perpendicular to a reinforcing axis of the composite training material.

Thus, the first and second artificial neural networks are trained on images similar to the acquired images on which they carry out their detections.

According to an alternative embodiment compatible with the preceding alternative embodiments, the step of assigning is carried out using a clustering algorithm.

According to an alternative embodiment compatible with the preceding alternative embodiments, the images are acquired by a 3D imaging system that has a resolution higher than a threshold.

According to a sub-alternative embodiment of the preceding alternative embodiment, the threshold is 150 μm for the images acquired for the detection of the barycentres or 40 μm for the images acquired for the detection of the circumferences.

According to a sub-alternative embodiment of the preceding alternative embodiment compatible with the preceding sub-alternative embodiment, the images are acquired by synchrotron radiation imaging, by transmission electron microscopy imaging or by X-ray tomography.

A second aspect of the invention relates to a method for automatically reconstituting the architecture of the reinforcement of a composite material, comprising:

for each reinforcing axis of the composite material, the steps of the method for automatically reconstituting the architecture of the reinforcement of the composite material along the reinforcing axis, according to the first aspect of the invention a step of reconstituting the architecture of the reinforcement of the composite material from the architecture of each reinforcing thread along each reinforcing axis.

Thus, it is possible to reconstitute the reinforcement of a composite material by reconstituting the trajectory and/or the envelope of each reinforcing thread and as such be able to obtain the weaving topology and/or calculate the thermomechanical properties over the entire reinforcement.

A third aspect of the invention relates to a computer program product comprising instructions which, when the program is executed by a computer, lead the latter to implement the steps of the method according to the first and/or the second aspect of the invention.

A fourth aspect of the invention relates to a recording medium that can be read by a computer comprising instructions which, when they are executed by a computer, lead the latter to implement the steps of the method according to the first and/or the second aspect of the invention.

The invention and its different applications shall be better understood when reading the following description and examining the accompanying figures.

BRIEF DESCRIPTION OF THE FIGURES

The figures are presented for the purposes of information and in no way limit the invention.

DETAILED DESCRIPTION

Unless mentioned otherwise, the same element appearing in different figures has a unique reference.

A first aspect of the invention relates to a method for automatically reconstituting the architecture of the reinforcement of a composite material along a reinforcing axis.

A composite material is an assembly comprising at least one frame called a reinforcement, comprising reinforcing threads, also called strands, and a binder called matrix, generally constituted of a plastic material.

A reinforcing thread is comprised of a plurality of reinforcing fibres.

The reinforcing threads are arranged along at least one axis, called reinforcing axis.

The reinforcement is for example a superposition of reinforcing folds comprising reinforcing threads.

Figure 1:
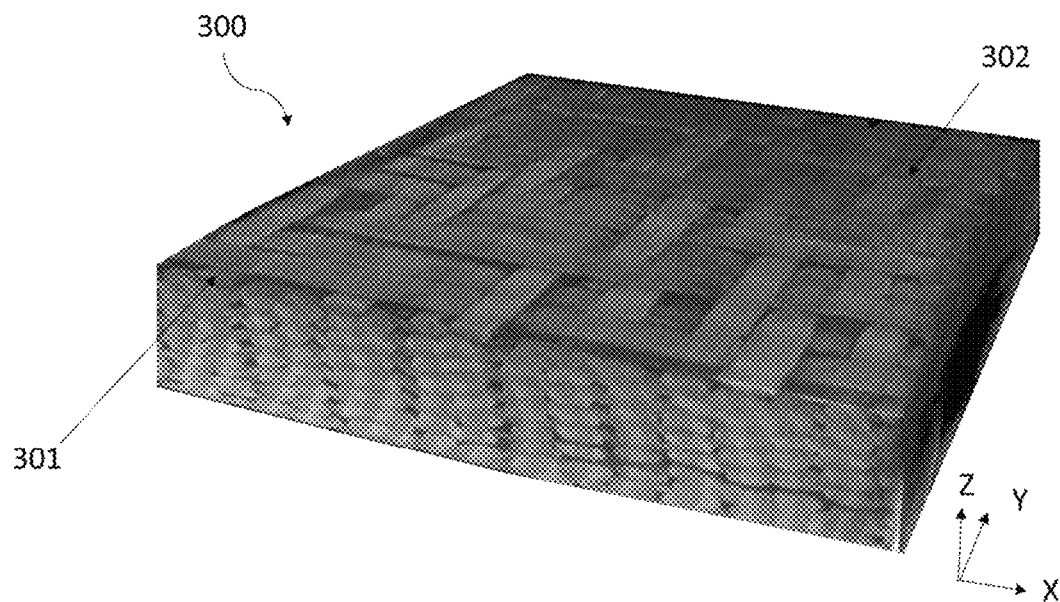
FIG. 1 shows a three-dimensional reconstruction of the architecture of the reinforcement of a composite material from X-ray tomography images.

FIG. 1 shows a three-dimensional reconstruction of the architecture of the reinforcement 300 of a composite material from X-ray tomography images.

In FIG. 1, the upper reinforcing fold 301 is constituted of reinforcing threads 302 arranged along an axis Y and of reinforcing threads 302 arranged along an axis X. The axes X and Y are therefore the reinforcing axes of the reinforcement 300 shown in FIG. 1.

In FIG. 1, the reinforcing axes X and Y are substantially perpendicular but the reinforcing folds 301 can comprise reinforcing threads 302 arranged along reinforcing axes forming an angle different from 90°. For example, the reinforcing axes X, Y can form an angle of 45°.

Figure 2:
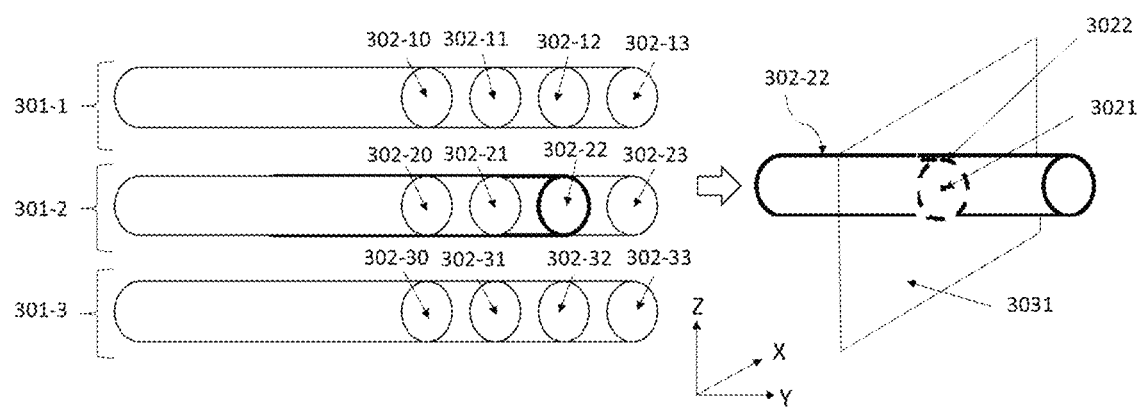
FIG. 2 shows a diagrammatical representation of a portion of the reinforcement of a composite material, on the left and of an isolated reinforcing thread, on the right.

FIG. 2 shows a diagrammatical representation of a portion of the reinforcement 300 of a composite material.

In FIG. 2, the portion of the reinforcement 300 comprises three reinforcing folds 301-1, 301-2 and 301-3. The first reinforcing fold 301-1 comprises four reinforcing threads 302-10, 302-11, 302-12, 302-13, the second reinforcing fold 301-2 comprises four reinforcing threads 302-20, 302-21, 302-22, 302-23 and the third reinforcing fold 301-3 comprises four reinforcing threads 302-30, 302-31, 302-32, 302-33, each reinforcing thread 302-10, 302-11, 302-12, 302-13, 302-20, 302-21, 302-22, 302-23, 302-30, 302-31, 302-32, 302-33 being arranged along the reinforcing axis Y.

The reinforcing folds 301 of the same reinforcement 300 can have different reinforcing axes X, Y. For example, the reinforcement 300 comprises two types of reinforcing folds 301, the first and the second type of reinforcing fold 301 each comprising two reinforcing axes X, Y forming an angle of 45° and being superimposed in such a way that the reinforcing axes X, Y of the first type form an angle of 45° with the reinforcing axes X, Y of the second type, the reinforcement 300 then comprises four different reinforcing axes.

The term "reconstituting the architecture of the reinforcement of a composite material" means the obtaining of a numerical model of the architecture of the reinforcement of the composite material then making it possible to carry out numerical characterisations of the composite material, for example the thermophysical and/or thermomechanical properties at each point of the reinforcement or the location of weaving anomalies.

The method according to a first aspect of the invention makes it possible to obtain a reconstitution of the architecture of the reinforcement 300 of the composite material along a reinforcing axis, for example in the case of FIG. 1, along the axis X or along the axis Y and in the case of FIG. 2, along the axis Y.

In the rest of the description, the method according to the first aspect of the invention shall be applied to the reinforcing axis Y, i.e. the architecture of the reinforcement 300 of the composite material shall be determined along the reinforcing axis Y.

Figure 8:
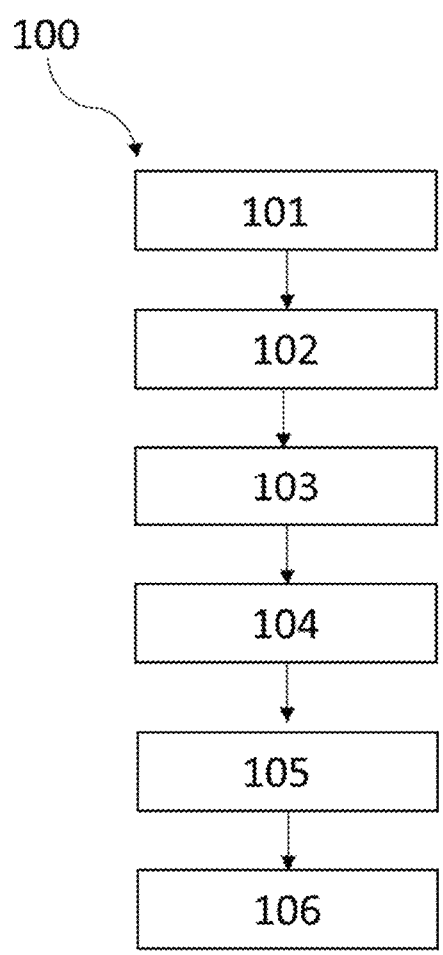
FIG. 8 is a block diagram showing the steps of the method according to the first aspect of the invention.

FIG. 8 is a block diagram showing the steps of the method 100 according to the first aspect of the invention.

A first step 101 of the method 100 consists of acquiring a plurality of images of the reinforcement 300 of the composite material.

The images are for example acquired by a 3D imaging system that has a resolution higher than a threshold, for example a synchrotron radiation imaging or transmission electron microscopy imaging system or by X-ray tomography.

Each image is acquired along a section plane perpendicular to the reinforcing axis Y.

FIG. 2 shows a diagrammatical representation of an isolated reinforcing thread 302-22, arranged along the reinforcing axis Y and intersected by a section plane 3031 perpendicular to the reinforcing axis Y.

As shown in FIG. 2, an image acquired along the section plane 3031 comprises a section of the reinforcing thread 302. This section can be defined by its barycentre 3021 and it circumference 3022.

The resolution threshold of the 3D imaging system is for example 150 µm in order to be able to detect the barycentres 3021 of reinforcing threads 302 in an acquired image 303 and 40 µm in order to be able to detect the circumferences 3022 of reinforcing threads 302 in an acquired image 303.

Figure 3:
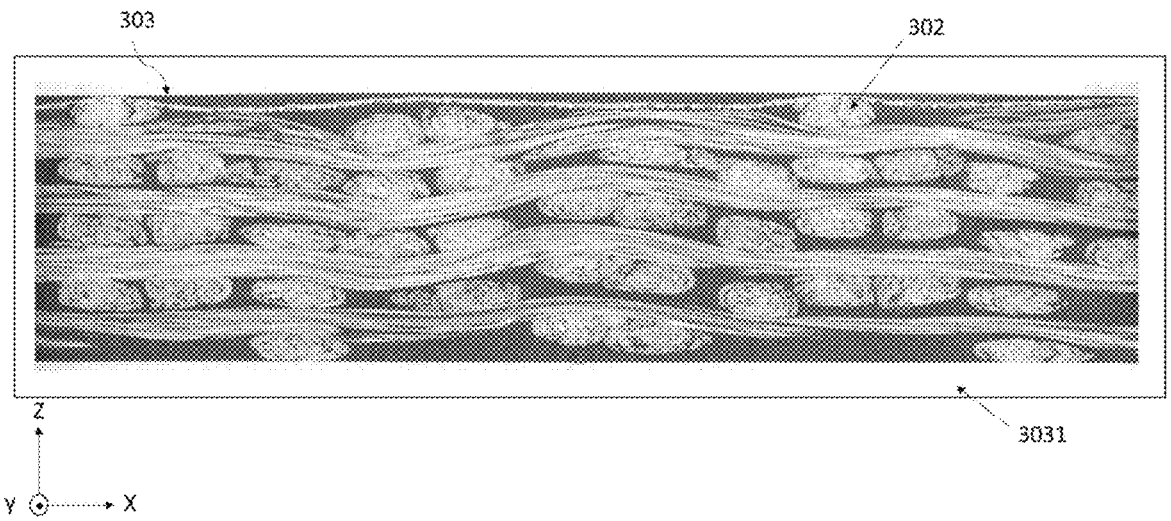
FIG. 3 shows an X-ray tomography image of the reinforcement of a composite material acquired during the first step of the method according to the first aspect of the invention.

FIG. 3 shows an image 303 acquired by X-ray tomography during the first step 101 of the method 100.

The image 303 is acquired along a section plane 3031 comprising the axes X and Z and perpendicular to the reinforcing axis Y. The image 303 comprises a plurality of reinforcing thread 302 sections.

The section planes 3031 of the images 303 acquired during the first step 101 are parallel with each other and not confounded, i.e. the section planes 3031 are spaced between them along the reinforcing axis Y. Each section plane 3031 can therefore be associated with a position on the reinforcing axis Y.

For example, if the acquisition of three images 303 perpendicularly to the reinforcing axis Y along section planes 3031 each spaced 1 mm is carried out, the first image 303 is for example associated with the position 0 mm on the reinforcing axis Y, the second 303 at the position 1 mm on the reinforcing axis Y and the third image 303 at the position 2 mm on the reinforcing axis Y.

The section planes 3031 may or may not be spaced by the same distance along the reinforcing axis Y.

A second step 102 of the method 100 consists of using a first artificial neural network trained with a first training database to detect the barycentre 3021 of each section of reinforcing thread 302 in each image 303 acquired hereinabove.

An artificial neural network comprises at least one layer of artificial neurons each comprising at least one artificial neuron. The artificial neurons of the artificial neural network are connected together by synapses and to each synapse is assigned a synaptic coefficient.

The training makes it possible to train the artificial neural network for a predefined task, by updating the synaptic coefficients in such a way as to minimise the error between the output data provided by the artificial neural network and the true output data, i.e. what the artificial neural network should supply as output for fulfilling the predefined task on a certain input data.

A training database therefore comprises input data, each associated with true output data.

The first artificial neural network has for function to detect the barycentre 3021 of each section of reinforcing thread 302 present in an image 303 acquired along a section plane perpendicular to the reinforcing axis Y.

The first training database therefore comprises images of the same or of several composite training materials, each acquired along a section plane perpendicular to a reinforcing axis of the composite training material, as well as data on the position of the barycentres 3021 of each section of reinforcing thread 302 in each image 303.

The composite training material or materials can be identical or different from the composite material of which it is desired to reconstitute the architecture of the reinforcement 300.

Thanks to the method 100 according to the first aspect of the invention, it is possible to reconstitute the architecture of the reinforcement 300 of a composite material before assembly with the matrix or after assembly with the matrix.

The images of the first training database can therefore be reinforcing images 300 of composite materials before assembly with their matrices and/or reinforcing images 300 of composite materials after assembly with their matrices.

Figure 4:
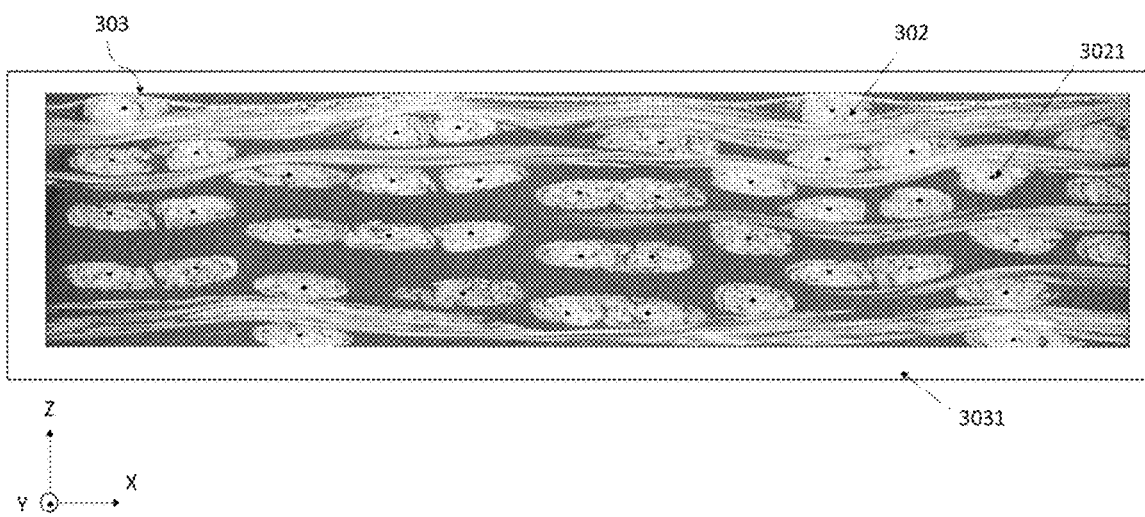
FIG. 4 shows an X-ray tomography image of the reinforcement of a composite material acquired during the first step of the method according to the first aspect of the invention on which are indicated the barycentres detected during the second step of the method according to the first aspect of the invention.

FIG. 4 shows an image 303 acquired by X-ray tomography during the first step 101 of the method 100. The barycentre 3021 of each section of reinforcing thread 302 is indicated therein.

As in FIG. 3, the image 303 of FIG. 4 was acquired along a section plane 3031 comprising the axes X and Z, perpendicularly to the reinforcing axis Y.

To each barycentre 3021 detected in the image 303 is associated a position in the section plane 3031, i.e. in the reference frame defined by the axes X and Z.

A third step 103 of the method 100 consists of using a second artificial neural network trained with a second training database in order to detect the circumference 3022 of each section of reinforcing thread 302 in each image 303 acquired hereinabove.

The second artificial neural network has for function to detect the circumference 3022 of each section of reinforcing thread 302 present in an image 303 acquired along a section plane 3031 perpendicular to the reinforcing axis Y.

The second training database therefore comprises images of the composite training material or materials, each acquired along a section plane perpendicular to a reinforcing axis of the composite training material, as well as data on the position of the different points of the circumference 3022 of each section of reinforcing thread 302 in each image 303.

The images of the first training database can be identical to the images of the second training database.

The data on the position of the barycentres 3021 comprised in the first training database and the data on the position of the points of the circumference 3022 comprised in the second training database can be obtained manually or by image processing algorithms that use for example mathematical morphology algorithms.

The first and second artificial neural networks are for example multi-layer perceptrons or convolutional artificial neural networks.

Figure 5:
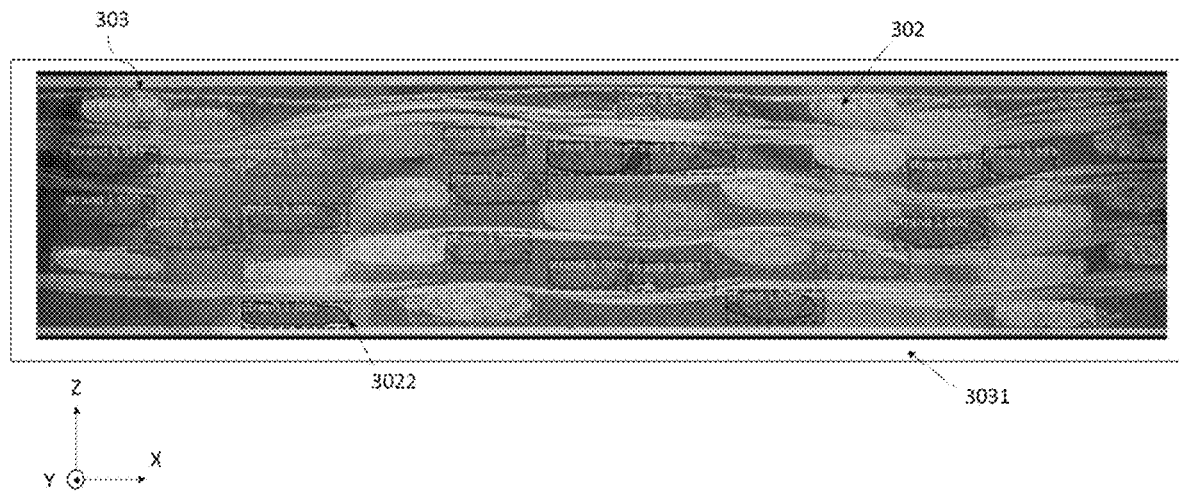
FIG. 5 shows an X-ray tomography image of the reinforcement of a composite material acquired during the first step of the method according to the first aspect of the invention on which are indicated the circumferences detected during the third step of the method according to the first aspect of the invention.

FIG. 5 shows an image 303 acquired by X-ray tomography during the first step 101 of the method 100. The circumference 3022 of each section of reinforcing thread 302 was indicated in the image 303.

As in FIGS. 3 and 4, the image 303 of FIG. 5 was acquired along a section plane 3031 comprising the axes X and Z perpendicularly to the reinforcing axis Y.

To each point of the detected circumference 3022 is associated a position in the section plane 3031, i.e. in the reference frame defined by the axes X and Z.

The second step 102 or third step 103 of the method 100 can be optional, i.e. the architecture of the reinforcement 300 of the composite material can be reconstituted by carrying out solely the second step 102 or by carrying out solely the third step 103 or by carrying out the second step 102 and the third step 103.

A fourth step 104 of the method 100 consists of assigning a tag, corresponding to a reinforcing thread 302 to each detected barycentre 3021 in one or more images 303 acquired hereinabove as reference images if the second step 102 was carried out hereinabove or to each detected circumference 3022 in one or more images 303 acquired hereinabove chosen as reference images if the third step 103 was carried out hereinabove.

In other words, during the fourth step 104, the tags are assigned either to each barycentre 3021 in the reference images in the case where only the second step 102 is carried out or in the case where the second 102 and third steps 103 are carried out, or to each circumference 3022 in the reference images in the case where only the third step 103 is carried out or in the case where the second 102 and third steps 103 are carried out.

The term "tag assigned to an element" means a label assigned to an element making it possible to identify it and to distinguish it from other elements.

An acquired reference image is for example selected every N acquired images 303. For example, if there are 20 acquired images 303 and it is desired to select an acquired reference image every 5 images, it is possible for example to select the first acquired image 303, the sixth acquired image 303, the eleventh acquired image 303 and the sixteenth acquired image 303.

Figure 6:
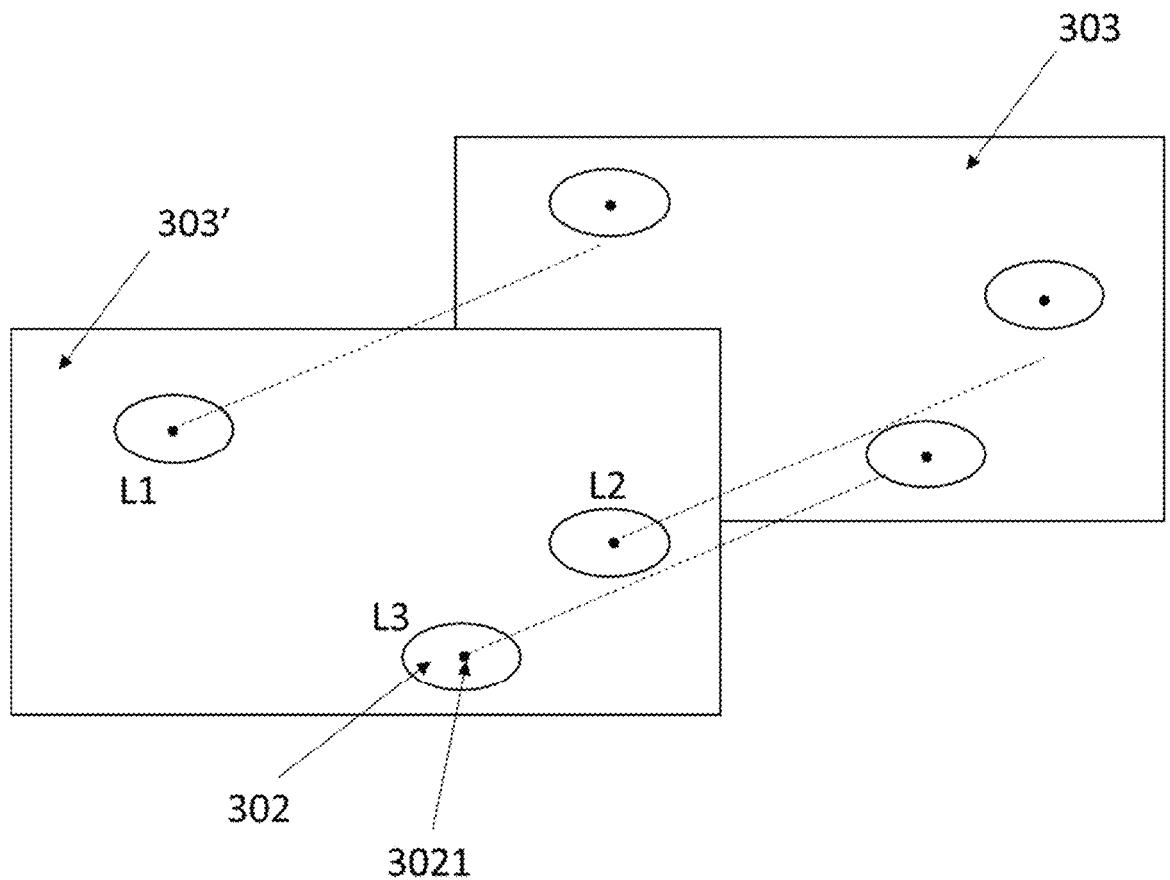
FIG. 6 shows a diagrammatical representation of a reference image tagged during the fourth step of the method according to the first aspect of the invention and of an image showing sections of reinforcing thread to which tags will be assigned during the fifth step of the method according to the first aspect of the invention.

FIG. 6 shows a diagrammatical representation of an acquired reference image 303'. The acquired reference image 303' comprises three sections of reinforcing threads 302 and therefore three barycentres 3021. To each barycentre 3021 is associated a tag L1, L2 or L3. Thus, the first barycentre 3021 located towards the upper left corner corresponds to the tag L1, the second barycentre 3021 located towards the middle right to the tag L2 and the third barycentre 3021 located towards the bottom middle to the tag L3.

A fifth step 105 of the method 100 consists of assigning, for each acquired image 303 that was not selected as an acquired reference image 303', to each barycentre 3021 present in the acquired image 303 if the second step 102 was carried out hereinabove and/or to each circumference 3022 present in the acquired image 303 if the third step 103 was carried out hereinabove, the tag of the barycentre 3021 and/or of the corresponding circumference 3022 in the acquired reference image 303' having been assigned in the fourth step 104.

In other words, if during the fourth step 104, the tags were assigned to the barycentres 3021 in the reference images, the fifth step 105 consists of assigning, for each acquired image 303 that was not selected as an acquired reference image 303', to each barycentre 3021 present in the acquired image 303 the tag of the corresponding barycentre 3021 in the acquired reference image and if the third step 103 was also carried out, of assigning, for each acquired image 303 that was not selected as an acquired reference image 303', to each circumference 3022 present in the acquired image 303 the tag of the corresponding barycentre 3021 in the acquired reference image.

If during the fourth step 104, the tags were assigned to the circumferences 3022 in the reference images, the fifth step 105 consists of assigning, for each acquired image 303 that was not selected as an acquired reference image 303', to each circumference 3022 present in the acquired image 303 the tag of the corresponding circumference 3022 in the acquired reference image and if the second step 102 was also assigned, of assigning, for each acquired image 303 that was not selected as an acquired reference image 303', to each barycentre 3021 present in the acquired image 303 the tag of the corresponding circumference 3022 in the acquired reference image.

For example, in the case where the tagging was carried out on the barycentres 3021, if in the reference image 303' acquired immediately before the image 303 on which the fourth step 104 is carried out, six barycentres 3021 were tagged, each one of the six detected barycentres 3021 in the acquired image 303 will be associated with one of the tagged barycentres 3021 in the acquired reference image 303'.

In FIG. 6, the acquired image 303 comprises three barycentres 3021, a first barycentre 3021 located in the upper left corner, a second barycentre 3021 located towards the middle right and a third barycentre 3021 located towards the middle bottom. By comparing the acquired image 303 and the immediately preceding acquired reference image 303', it is possible to associate the barycentre 3021 located in the upper left corner with the tag L1, the barycentre 3021 located towards the middle bottom with the tag L3 and the barycentre 3021 located towards the middle right with the tag L2, for example by selecting the tag corresponding to the barycentre 3021 of the acquired reference image 303' having a minimum distance with the position of the detected barycentre 3021 in the acquired image 303.

The fifth step 105 is for example carried out by a clustering algorithm, for example the DBSCAN algorithm.

At the end of the fifth step 105, the barycentres 3021 and/or the circumferences 3022 of each acquired image 303 are tagged. The barycentres 3021 and/or the circumferences 3022 that have the same tag correspond to the same reinforcing thread 302.

A sixth step 106 of the method 100 consists of reconstituting the architecture of each reinforcing thread 302 arranged along the reinforcing axis Y.

In the case where the second step 102 of the method 100 is carried out, reconstituting the architecture of each reinforcing thread 302 is carried out from the position, in its section plane 3031, of each barycentre 3021 having the tag of the reinforcing thread 302 and the position on the reinforcing axis Y associated with the section plane 3031 and therefore with the image 303 acquired wherein the barycentre 3021 was detected.

Returning to the simple example of acquiring three images 303 along planes each spaced 1 mm, if the position is known on the barycentre 3021 of the reinforcing thread 302 in each one of the images 303 acquired along a section plane 3031 perpendicular to the reinforcing axis Y, it is possible to approximate the trajectory of the reinforcing thread 302.

For example, if the barycentre 3021 of the reinforcing thread 302 is located at the coordinate point (X1, Z1) in a reference frame defined by the axes X and Z in the first image 303, then at the coordinate point (X2, Z2) in the second image 303 and then at coordinate point (X3, Z3) in the third image 303, it is known that the reinforcing thread 302 has a trajectory that passes through point (X1, Z1) at the position 0 mm on the reinforcing axis Y, through the point (X2, Z2) at the position 1 mm and through the point (X3, Z3) at the position 2 mm.

Thus, by minimising the spacing between the section planes 3031 of the different acquired images 303, the precision of the approximation of the trajectory of the reinforcing thread 302 is improved.

Figure 7:
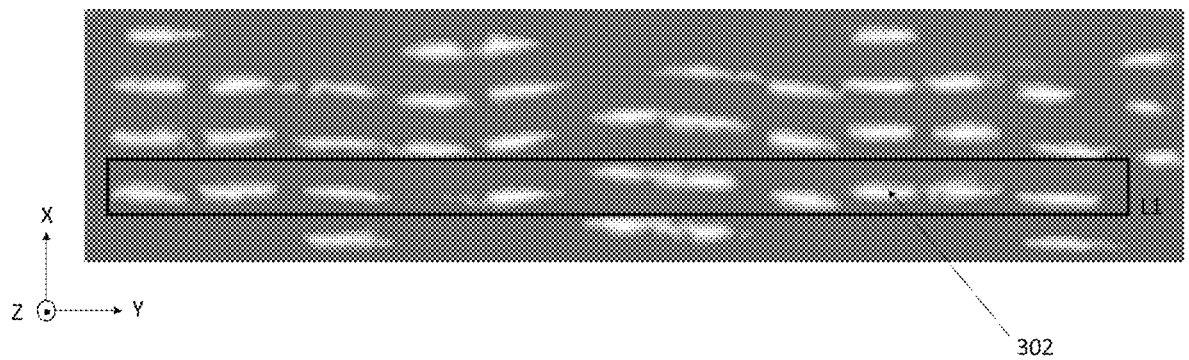
FIG. 7 shows the position of each barycentre detected during the second step of the method according to the first aspect of the invention in a reference frame defined from the reinforcing axis and of an axis parallel to the section planes.

FIG. 7 shows the position of each barycentre 3021 detected during the second step 102 of the method 100 in a reference frame defined from the reinforcing axis Y and an axis X parallel to the section planes 3031.

Returning to the preceding example, this reverts to placing the three barycentres 3021 in the reference frame defined by the axes X and Y, i.e. placing the points X1, X2, X3 according to the distance associated with the acquired image 303 on the reinforcing axis Y.

In FIG. 7, for a given value along the axis X, up to 4 barycentres 3021 are shown, which means that there are up to four different reinforcing threads 302.

By adding the information concerning the tags associated with the barycentres 3021 as in FIG. 7 for the reinforcing thread 302 associated with the tag L1, it is possible to discriminate the trajectories of the different reinforcing threads 302.

In the case where the third step 103 of the method 100 is carried out, the reconstituting of the architecture of each reinforcing thread 302 is carried out from the position, in its section plane 3031, of each point of the circumference 3022 having the tag of the reinforcing thread 302 and the position on the reinforcing axis Y associated with the section plane 3031 and therefore the acquired image 303 wherein the barycentre 3021 was detected.

If the second 102 and third 103 steps are carried out, it is then possible to supplement FIG. 7 by adding the dimension of the reinforcing thread 302 along the axis X.

A second aspect of the invention relates to a method for automatically reconstituting the complete architecture of the reinforcement 300 of the composite material.

Figure 9:
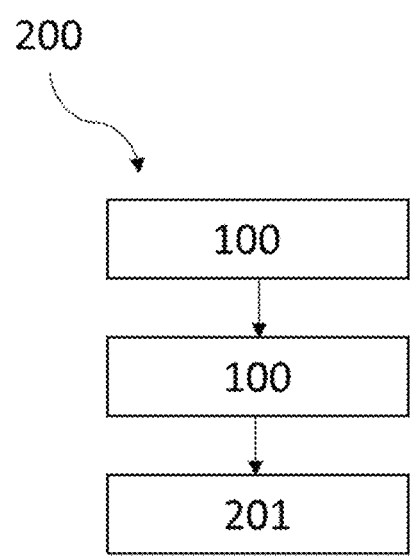
FIG. 9 is a block diagram showing the steps of the method according to the second aspect of the invention.

FIG. 9 is a block diagram showing the steps of the method 200 according to the second aspect of the invention.

The method 200 comprises the steps of the method 100 according to the first aspect of the invention for each reinforcing axis X, Y of the reinforcement 300.

If, as in the example described hereinabove, the reinforcement 300 comprises four reinforcing axes, the method according to the second aspect of the invention comprises the steps of the method 100 according to the first aspect of the invention for each one of the four reinforcing axes.

In FIG. 9, the steps of the method 100 are carried out twice, which means that the reinforcement 100 of which it is desired to reconstitute the architecture has two reinforcing axes X, Y.

At the end of these steps, the architecture of each reinforcing thread 302 is known since each reinforcing thread 302 is arranged along any one of the reinforcing axes X, Y.

The last step 201 then consists of reconstituting the complete architecture of the reinforcement 300 of the composite material from the architecture of each reinforcing thread 302 of the reinforcement 300.

For example, to reconstitute the 3D architecture of the reinforcement 300 as in FIG. 1, it is sufficient to place each reinforcing thread 302 in the reference frame defined by the axes, X, Y and Z.

The invention claimed is:

1. A method for automatically reconstituting the architecture, along a reinforcing axis, of the reinforcement of a composite material, the reinforcement comprising a plurality of reinforcing threads arranged along the reinforcing axis, the method comprising:
   acquiring a plurality of images of the reinforcement of the composite material, each image being acquired along a section plane parallel and not confounded with the section planes of the other images acquired, each image acquired being associated with a position on the reinforcing axis perpendicular to the section planes;
   for each image acquired, detecting, using a first artificial neural network trained with a first training database, the barycentre of each section of reinforcing thread present in the acquired image and/or detecting, using a second artificial neural network trained with a second training database, a circumference of the section of each reinforcing thread present in the acquired image;
   for at least one acquired image, referred to as acquired reference image, chosen from the acquired images, assigning a tag corresponding to a reinforcing thread to each detected barycentre or to each detected circumference in the acquired reference image;

for each image acquired that was not chosen as an acquired reference image, assigning, to each detected barycentre and/or to each detected circumference in the acquired image, the tag of the corresponding barycentre or of the corresponding circumference in the acquired reference image;

reconstituting the architecture of each reinforcing thread arranged along the reinforcing axis from each detected barycentre and/or from each detected circumference having the tag of the reinforcing thread and the position on the reinforcing axis associated with the acquired image on which the barycentre has been detected and/or the circumference has been detected.

2. The method according to claim 1, wherein the first and second artificial neural networks are multi-layer perceptrons and/or convolutional artificial neural networks.

3. The method according to claim 1, wherein the first and the second training databases each comprise a plurality of images of at least one composite training material each acquired along a section plane perpendicular to a reinforcing axis of the composite training material.

4. The method according to claim 1, wherein the assigning the tag of the corresponding barycentre is carried out using a clustering algorithm.

5. The method according to claim 1, wherein the images are acquired by a 3D imaging system that has a resolution higher than a threshold.

6. The method according to claim 5, wherein the threshold is 150 µm for the images acquired for the detection of the barycentres or 40 µm for the images acquired for the detection of the circumferences.

7. The method according to claim 5, wherein the images are acquired by synchrotron radiation imaging, by transmission electron microscopy imaging or by X-ray tomography.

8. A method for automatically reconstituting the architecture of the reinforcement of a composite material, comprising:

for each reinforcing axis of the composite material, the steps of the method for automatically reconstituting the architecture of the reinforcement of the composite material along the reinforcing axis, according to claim 1, a step of reconstituting the architecture of the reinforcement of the composite material from the architecture of each reinforcing thread along each reinforcing axis.

9. A computer program product comprising instructions which, when the program is executed by a computer, lead the latter to implement the steps of the method according to claim 1.

10. A non-transitory recording medium that is readable by a computer comprising instructions which, when the instructions are executed by a computer, lead the computer_to implement the steps of the method according to claim 1.

* * * * *